United States Patent
Guo et al.

(10) Patent No.: US 8,914,662 B2
(45) Date of Patent: Dec. 16, 2014

(54) IMPLEMENTING TRANSPARENT CLOCK BY CORRECTING TIME INFORMATION CARRIED IN DATA USING RESIDENCE TIME INFORMATION

(75) Inventors: Xin Guo, Shenzhen (CN); Hongjian Zhai, Shenzhen (CN); Chang Zhou, Shenzhen (CN); Hongqi Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 877 days.

(21) Appl. No.: 13/258,401

(22) PCT Filed: Sep. 17, 2009

(86) PCT No.: PCT/CN2009/074016
§ 371 (c)(1),
(2), (4) Date: Sep. 22, 2011

(87) PCT Pub. No.: WO2010/057398
PCT Pub. Date: May 27, 2010

(65) Prior Publication Data
US 2012/0072761 A1    Mar. 22, 2012

(30) Foreign Application Priority Data

Nov. 21, 2008    (CN) .......................... 2008 1 0179013

(51) Int. Cl.
*G06F 1/12* (2006.01)
*H04J 3/06* (2006.01)
*H04L 12/26* (2006.01)

(52) U.S. Cl.
CPC ........... *H04J 3/0673* (2013.01); *H04L 43/0852* (2013.01); *H04L 43/106* (2013.01); *H04J 3/0658* (2013.01); *H04J 3/0638* (2013.01); *H04J 3/0661* (2013.01); *H04J 3/0682* (2013.01); *G06F 1/12* (2013.01); *H04J 3/0667* (2013.01)
USPC ........................................................ 713/600

(58) Field of Classification Search
CPC ..... G06F 1/12; H04L 43/106; H04L 43/0858; H04L 43/0852; H04J 3/0667; H04J 3/0673; H04J 3/0697; H04J 3/0682; H04J 3/0658; H04J 3/0661; H04J 3/0679; H04J 3/0638
USPC ........................................................ 713/600
See application file for complete search history.

(56) References Cited

U.S. PATENT DOCUMENTS

| 6,081,899 | A | 6/2000 | Byrd |
| 7,778,283 | B2* | 8/2010 | Eidson .................... 370/503 |
| 2006/0245454 | A1* | 11/2006 | Balasubramanian et al. 370/509 |
| 2008/0181112 | A1 | 7/2008 | Beck et al. |

FOREIGN PATENT DOCUMENTS

| CN | 101079686 A | 11/2007 |
| CN | 101232340 A | 7/2008 |
| CN | 101425890 A | 5/2009 |

OTHER PUBLICATIONS

Garner, Geoffrey M., Description of Use of IEEE 1588 Peer-to-Peer Transparent Clocks in A/V Bridging Networks, May 12 2006, Ieee802, Revision 2.*

Lee et al., Proceedings of the 2005 Conference on IEEE 1588 Standard for a Precision Clock Synchronization Protocol for Networked Measurement and Control Systems, Dec. 2005, NISTIR 7302.*

International Search Report in international application No. PCT/CN2009/074016, mailed on Dec. 24, 2009.

English Translation of the Written Opinion of the International Search Authority in international application No. PCT/CN2009/074016, mailed on Dec. 24, 2009.

* cited by examiner

*Primary Examiner* — Thomas Lee
*Assistant Examiner* — Danny Chan
(74) *Attorney, Agent, or Firm* — Oppedahl Patent Law Firm LLC

(57) ABSTRACT

The present invention discloses a device and method for implementing a transparent clock. The device comprises: a clock module, a data identification module and a data correction module, wherein the clock module is connected with the data identification module and the data correction module respectively, and used for providing clock information to the data identification module and the data correction module; the data identification module is used for receiving data and acquiring current time information from the clock module; and the data correction module is connected with the data identification module, and is used for accumulating a positive or negative value of the current time information with the time information included in the data according to an outputting direction of the data and outputting the accumulated time information together with the data. By adopting the present invention, the residence time information of the data in the switching node is acquired by a hardware device, and the time information included in the data is corrected according to the residence time information, so that the transparent clock of the data can be effectively implemented, and the acquired residence time information is of a high precision and is acquired stably.

4 Claims, 5 Drawing Sheets

IMPLEMENTING TRANSPARENT CLOCK BY CORRECTING TIME INFORMATION CARRIED IN DATA USING RESIDENCE TIME INFORMATION

TECHNICAL FIELD

The present invention relates to the field of communications, in particular to a device and method for implementing a transparent clock.

BACKGROUND

At present, network technologies have been developed, and the Ethernet technology thereof, with the characteristics of high openness, wide application, low cost and the like, has been gradually and widely applied to many fields, such as the information management and communication in the upper layer in the process control field and communication field of commercial computers.

In the distributed Ethernet, the clock synchronization technology is one of key technologies of the Ethernet technology, and the clock synchronization directly affects the real time property of the network communication. The IEEE1588 standard provides a solution for the clock synchronization in the Ethernet of which the basic function is making other clocks in the distributed network synchronous with the most precise clock. The IEEE1588 standard defines a Precision Time Protocol (PTP) which is used for performing submicrosecond synchronization of the clocks in sensors, executors and other terminal devices in a standard Ethernet or other distributed bus systems adopting multicast technology.

There are many switching nodes (such as switches and routers) inside a network, in the V2 version of the IEEE1588 protocol, it is required to calculate a residence time of related data in the switching nodes and a concept of transparent clock is proposed, i.e., subtracting the residence time of the 1588 protocol data in a switching node from the total transmission time of the data, so as to achieve the "transparent transmission" effect of the data in the switching node. Therefore, the time synchronization precision can be effectively improved by precisely calculating the residence time of the 1588 protocol data in the transparent clock (switching node) and by correcting the 1588 protocol data according to the residence time. Accordingly, in order to calculate the residence time of the protocol data in the switching node, the time information of the 1588 protocol data inputting into or outputting from the switching node must be acquired.

At present, in the related technologies, the IEEE1588 protocol stack is implemented and the related information of a time stamp (i.e., transparent clock) is acquired by software. Although the transparent clock of the 1588 protocol data can be implemented by software, there is still uncertainty and fluctuation, so that the synchronization precision can be seriously restricted due to the jittering of the software.

For the problems of poor precision, instability and strong fluctuation of the clock transparent transmission of the 1588 protocol data, there is still no effective solution.

SUMMARY

In consideration of the problems of poor precision, instability and strong fluctuation of the clock transparent transmission of the 1588 protocol data in the related technologies, the present invention is provided. Therefore, the present invention mainly aims to provide an improved solution for implementing the transparent clock for solving the abovementioned problems in the related technologies.

According to one aspect of the present invention, a device for implementing a transparent clock is provided, wherein the device is positioned at each port of a switching node.

The device for implementing the transparent clock comprises: a clock module, a data identification module and a data correction module, wherein the clock module is connected with the data identification module and the data correction module respectively, and used for providing clock information to the data identification module and the data correction module; the data identification module is used for receiving data and acquiring current time information from the clock module; and the data correction module is connected with the data identification module, and used for accumulating a positive or negative value of the current time information with time information included in the data according to an outputting direction of the data and outputting the accumulated time information together with the data.

Preferably, the outputting direction of the data may comprise outputting from the device to the switching node, and accordingly the data correction module may be used for accumulating the negative value of the current time information with the time information included in the data.

Preferably, the outputting direction of the data may comprise outputting from the device to a next switching node of the switching node, and accordingly the data correction module may be used for accumulating the positive value of the current time information with the time information included in the data.

Preferably, the device further comprises: a caching module, used for caching the data and the current time information received by the data identification module; a checksum calculation module, used for determining an intermediate checksum according to the data acquired by the data identification module except for the time information included therein, sending the intermediate checksum to the data identification module, determining a checksum according to the accumulation result and the intermediate checksum in response to a calling by the data correction module and feeding the checksum back to the data correction module; and the data correction module may be further used for correcting the data according to the checksum.

Preferably, the data identification module may be further used for acquiring a type of the data, a length of the data and the intermediate checksum.

According to another aspect of the present invention, a method for implementing a transparent clock is provided.

The method for implementing the transparent clock comprises: receiving data and acquiring current time information, wherein the data includes time information; accumulating a positive or negative value of the current time information with the time information included in the data according to an outputting direction of the data, and outputting the accumulated time information together with the data.

Preferably, the processing of accumulating the positive or negative value of the current time information with the time information included in the data according to the outputting direction of the data may specifically comprise: when the data is output to a switching node, accumulating the negative value of the current time information with the time information included in the data; and when the data is output to a next switching node of the switching node, accumulating the positive value of the current time information with the time information included in the data.

Preferably, prior to accumulating the time information included in the data, the method may further comprise: caching the received data and information; and determining an intermediate checksum according to the data except for the time information included therein.

Preferably, after accumulating the time information included in the data, the method may further comprise: determining a checksum according to the accumulation result and the intermediate checksum; and correcting the data according to the checksum.

Preferably, after the data is received, the method may further comprise: acquiring information of the data, wherein the information includes a type of the data, a length of the data and the intermediate checksum.

Through the technical solution of the present invention, the residence time information of the data in the switching node is acquired by a hardware device, and the time information included in the data is corrected according to the residence time information, so that the transparent clock of the data can be effectively implemented, and the residence time information is of a high precision and is acquired stably; therefore, the problems of poor precision, instability and strong fluctuation of the clock transparent transmission of the 1588 protocol data in the related technologies can be solved, and the aim of improving the clock synchronization precision of the 1588 system can be achieved.

Other characteristics and advantages of the present invention will be described in the following description, and partially become obvious from the description or are understood by implementing the present invention. The aim and other advantages of the present invention can be implemented and obtained in the structures specified in the description, claims and drawings.

BRIEF DESCRIPTION OF THE DRAWINGS

The drawings described herein are used for the further understanding of the present invention and compose one part of the present application; and the exemplary embodiments of the present invention and the description thereof are used for explaining the present invention and do not improperly limit the present invention. In the drawings.

DETAILED DESCRIPTION

Function Overview

In consideration of the problems of poor precision, instability and strong fluctuation of the clock transparent transmission of the 1588 protocol data in the related technologies, the embodiments of the present invention provide a device and method for implementing the transparent clock, wherein the residence time information of data in the switching node is acquired by a hardware device, and the time information included in the data is corrected according to the residence time information, so that the transparent clock of the data can be effectively implemented, and the residence time information is of a high precision and is acquired stably.

Figure 1:
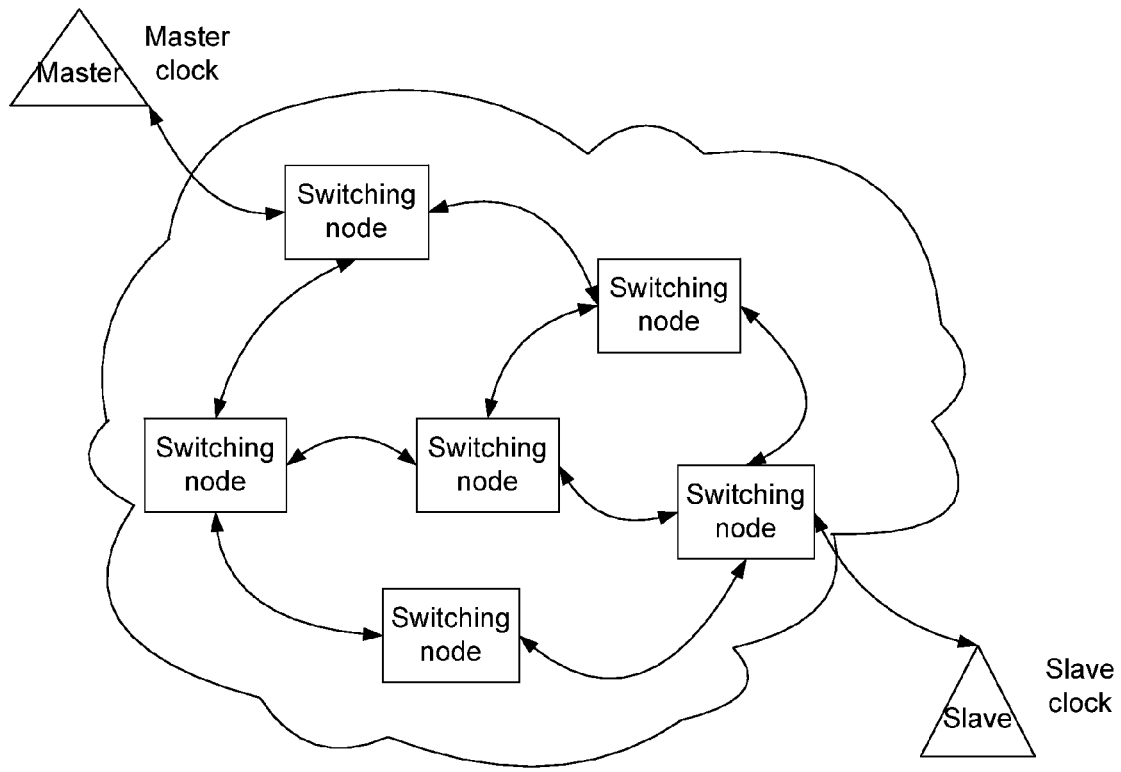
FIG. 1 is a block diagram showing the structure of the 1588 clock synchronization network according to related technologies.

Before the description of the embodiments of the present invention, the 1588 clock synchronization network is described at first. FIG. 1 shows the network structure of the 1588 clock synchronization according to related technologies; as shown in FIG. 1, the network consists of a series of switching nodes (such as switches and routers); besides, there is a master clock and a slave clock in the network, and 1588 protocol message is switched between the master and slave clocks by a plurality of switching nodes.

The embodiments of the present invention are described below with reference to the drawings; and it should be understood that the preferred embodiments described herein are only used for describing and explaining the present invention rather than limiting the present invention.

It should be understood, if not conflicted, the embodiments and features thereof can be combined with one another and shall fall within the protection scope of the present invention.

Device Embodiment

According to one embodiment of the present invention, a device for implementing the transparent clock is provided, wherein the device is positioned at each port of a switching node, and is used for acquiring the time information when the data is input into or output from the switching node and correcting time information included in the data according to the acquired time information, so as to implement the transparent clock.

Figure 2:
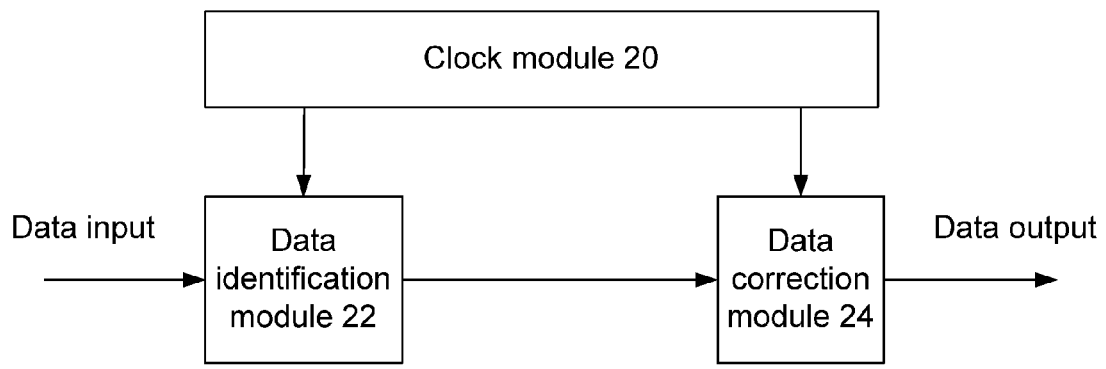
FIG. 2 is a block diagram showing the structure of a device for implementing a transparent clock according to one device embodiment of the present invention.

FIG. 2 shows the structure of a device for implementing the transparent clock according to the device embodiment of the present invention, as shown in FIG. 2, the device for implementing the transparent clock according to the device embodiment of the present invention includes a clock module 20, a data identification module 22 and a data correction module 24, the functions of which are described below in detail.

The clock module 20 is connected with the data identification module 22 and the data correction module 24 respectively to provide clock information for the data identification module 22 and the data correction module 24; and preferably, the clock modules in the device for implementing the transparent clock at each port of the switching node are synchronous.

The data identification module 22 (or called a message identification module) is used for receiving data and acquiring current time information from the clock module 20; preferably, the inputting direction of the data can be inputting from the last switching node of the current switching node to the device for implementing the transparent clock according to the device embodiment of the present invention at first, then outputting from the device to the current switching node, or can be inputting from the current switching node to the device at first, and then outputting from the device to the next switching node; and besides, the data identification module 22 is used for acquiring the time information from the clock module 20 when the data enters the device. Preferably, the data identification module 22 is further used for acquiring a type of the data, a length of the data and an intermediate checksum described below.

The data correction module 24 (or called a message correction module) is connected with the data identification module 22, and is used for accumulating a positive or negative value of the time information with the time information included in the data according to the outputting direction of the data, and outputting the accumulated time information together with the data; preferably, when the outputting direction of the data is outputting from the device for implementing the transparent clock according to the device embodiment of the present invention to the current switching node, the data correction module 24 is used for accumulating the negative value of the time information with the time information included in the data; and when outputting direction of the data is outputting from the device to the next switching node of the current switching node, the data correction module 24 is used for accumulating the positive value of the time information with the time information included in the data.

Through the device provided by the present invention, the residence time information of the data in the switching node can be acquired by the hardware device including the clock module, data identification module and data correction module, and the time information included in the data is corrected according to the residence time information, so that the transparent clock of the data can be effectively implemented; besides, the residence time information provided by the clock module is of a high precision and is acquired stably; and the data correction module accumulates the residence time to the included time information by direct assignment rather than simply recording the residence time information into the time information, which can save system resources and improve the processing efficiency of the system.

Figure 3:
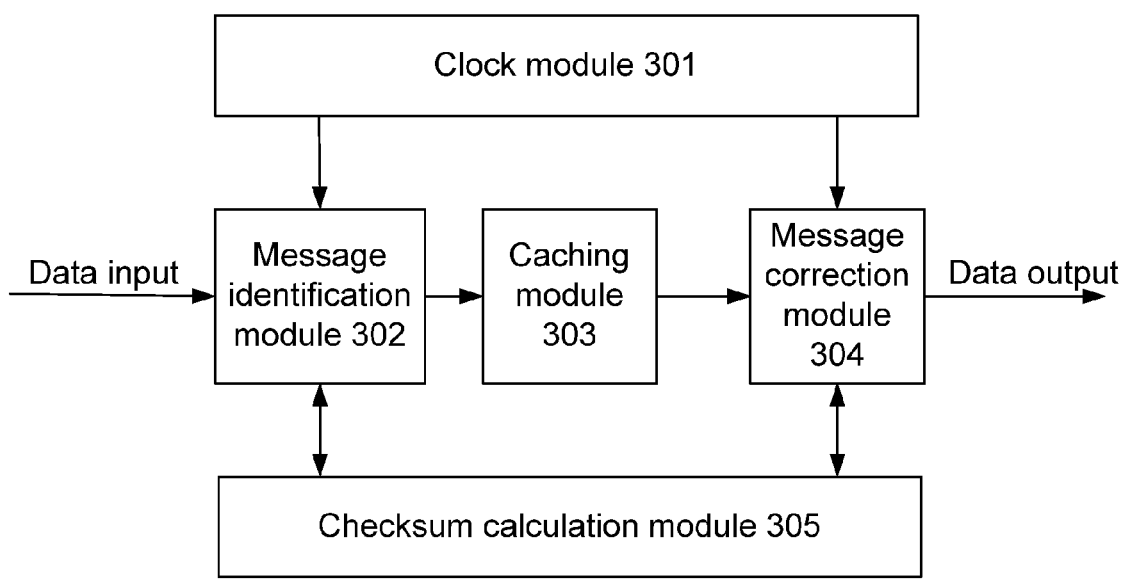
FIG. 3 is a block diagram showing the structure of a device for implementing the transparent clock according to one preferred embodiment of the present invention.

Based on the above description, FIG. 3 further shows the structure of a device for implementing the transparent clock according to one preferred embodiment of the present invention; as shown in FIG. 3, the device for implementing the transparent clock according to the preferred embodiment of the present invention includes a clock module 301, a message identification module 302, a caching module 303, a message correction module 304 and a checksum calculation module 305.

Taking the transparent clock processing of the 1588 protocol data performed by the device shown in FIG. 3 as an example, the functions of each module of the device shown in FIG. 3 are described below in detail.

As shown in FIG. 3, the clock module 301 is used for providing clock signals for other modules of the device. It can be a local counter of 125M which is driven by local clock pulse signals to perform accumulation in a clock period. As described above, in order to calculate the residence time of data messages in the switching node as precisely as possible, the clock pulse signals at all the ports of the switching node must be synchronous and each clock module is ensured to have the same calculation value at the same time. So, a corresponding time can be calculated according to the calculation value of the clock module 301 and the frequency of the clock pulse. The time information provided by the clock module 301 is adopted by the message identification module 302 and the message correction module 304. It can be seen that the 125M clock provided by the clock module 301 can increase the precision of the time information to nanosecond. The clock module 301 can correspond to the above clock module 20.

The message identification module 302 is used for receiving an input data packet and acquiring the following four kinds of basic information from the data packet. 1: the type of the data message; a 1588 protocol message is encapsulated in a User Datagram Protocol (UDP) message which is encapsulated in an IP message form; and the message identification module 302 will distinguish a 1588 event message (i.e., a 1588 protocol message or called 1588 protocol data) from a non-1588 event message, and perform different processes on them. 2: the length of the data message, which indicates the total length of an IP message. 3: time stamp information; once the message identification module 302 receives a data message, it acquires the time information at the corresponding time point from the clock module 301, i.e., the value is the entering time of the data message into the device and the negative value of the time value can be taken. 4: part of checksum information (or called intermediate checksum information) is acquired; as the hardware device can only correct the Correction Field (which carries time information) of the 1588 event message, the message identification module 302 will acquire an intermediate result of calculating the checksum of other fields except for the correction field by the checksum calculation module 305. The message identification module 302 transmits the four kinds of information and the message data to the caching module 303. The message identification module 302 can correspond to the data identification module 22.

The caching module 303 is used for caching the data and the data information received by the message identification module 302. Preferably, the caching module 303 can consist of two First In First Out (FIFO) queues, one of which is a data queue for storing the original data of the received messages, while the other of which is an information queue for storing the information of the messages acquired by the message identification module 302. The data and information in the caching module 303 can be read by the message correction module 304. Here, the caching module 303 can be storage media of many formats. In addition, the term "storage media" can refer to one or more devices for storing data and include a Read Only Memory (ROM), a Random Access Memory (RAM), a magnetic RAM, a magnetic core memory, disk storage media, optical storage media, a flash memory device and/or other machine readable media for storing information. The term "machine readable media" includes but is not limited to a portable or fixed storage device, an optical storage device, a wireless channel or various other media capable of storing, accommodating, or carrying instructions and/or data.

The message correction module 304 is used for correcting the 1588 event message leaving the device to form a final message, and outputting the data according to an instruction. According to the information of the data packet provided by the caching module 303, i.e., the precise entering time of the 1588 event message into the hardware device acquired by the clock module 301, the message correction module 304 accumulates a negative value of the time stamp provided by the caching module 303 to the Correction Field if the 1588 event message is a data packet input from the hardware device to the switching node, or accumulates a positive value of the time stamp provided by the caching module 303 to the Correction Field if the 1588 event message is a data packed output from the hardware device to the next switching node. In addition, the message correction module 304 calls the checksum calculation module 305 to calculate a final checksum information of the fields besides the Correction Field, and forms an output data message according to the updated Correction Field and the UDP checksum field. It can be seen that the message correction module 304 corrects the Correction Field of the data message by direct assignment rather than recording the residence time into the Correction Field, which can save system resources and improve the processing efficiency of the system. The message correction module 304 can correspond to the data correction module 24.

The checksum calculation module 305 is used for calculating the checksum information of the UDP message. The checksum is calculated by the following two steps: step 1, calculating the checksum information of the data except for the Correction Field for the 1588 message event message entering the hardware device to obtain an intermediate result, which is output to the information queue of the caching module 303 by the message identification module 302; and step 2, calculating the final checksum of the UDP messages for the time information of the 1588 message leaving the hardware device according to the updated Correction Field and the intermediate result of the checksum information provided by the caching module 303, and providing the final checksum to the message correction module 304 to form the final output message.

Through the hardware device shown in FIG. 3, the 1588 protocol data input into or output from the switching node can be subjected to precise transparent clock processing.

Figure 4:
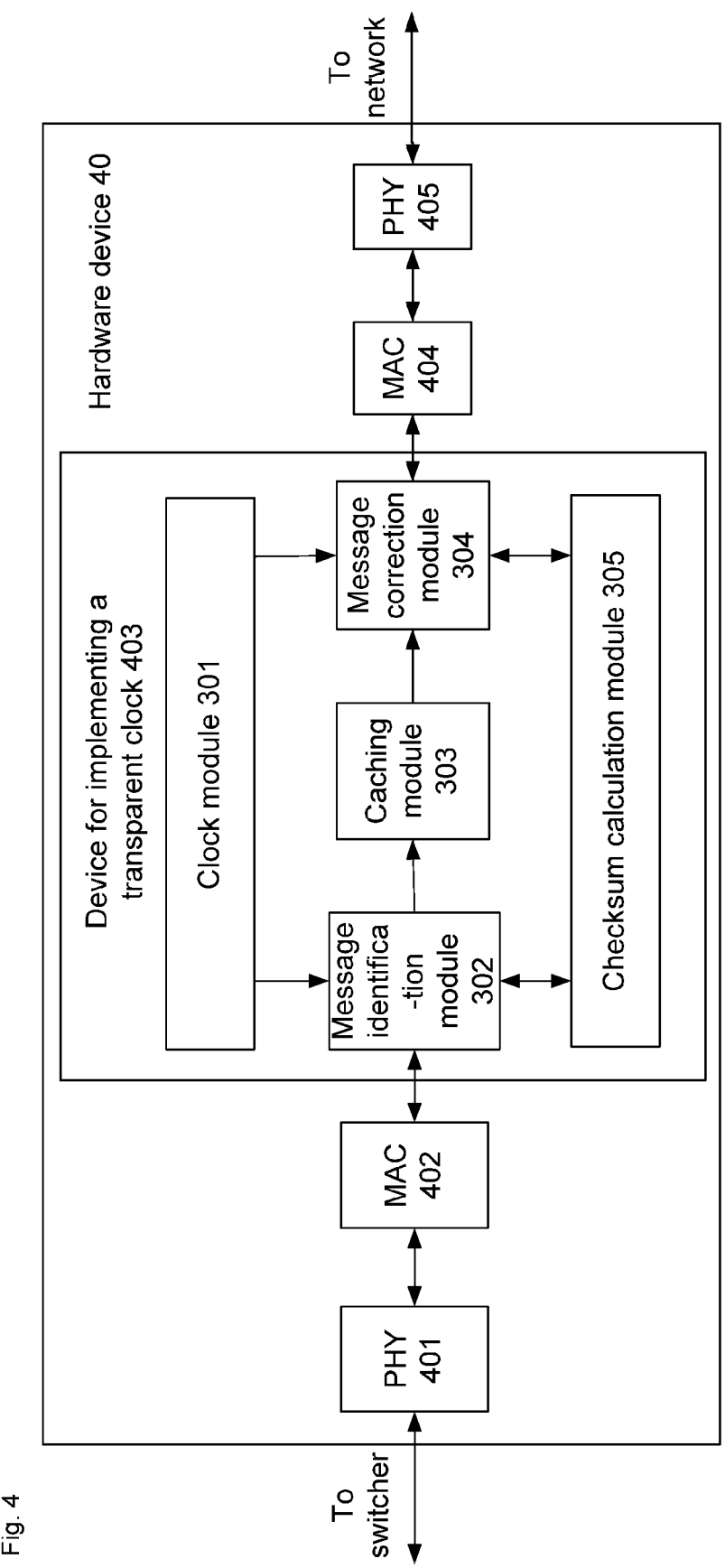
FIG. 4 shows the structure of a hardware device for specifically implementing the device shown in FIG. 3.

FIG. 4 shows the structure of a hardware device for specifically implementing the device shown in FIG. 3, as shown in FIG. 4, the hardware device 40 specifically includes: the device 403 for implementing the transparent clock shown in FIG. 3, and a Physical Layer (PHY) 401 and a Media Access Control (MAC) 402 connected to a switching node and a PHY 405 and an MAC 404 connected to a network. The whole hardware device 40 is positioned at each port of the switching node (such as a switch and a router) in a network to monitor all the messages input into or output from the switching node. The PHY 401 is connected with the switching node, while the PHY 405 is accessed to a network. An Ethernet data packet from the network to the switching node passes through the PHY 401 and the MAC 402 to form Ethernet frame data which is given a negative time tag by the device 403 for implementing the transparent clock and encapsulated by the MAC 404 and the PHY 405 to be input to the switching node. An Ethernet data packet from the switching node to the network passes through the PHY 405 and the MAC 404 to form Ethernet frame data which is given a positive time tag by the device 403 for implementing the transparent clock and encapsulated by the MAC 402 and the PHY 401 to be input to the network. The data processing ways in the two directions are basically the same. The functions of the device 403 for implementing the transparent clock are similar to that of the device shown in FIG. 3, thereby needing no further description here.

Method Embodiments

According to one embodiment of the present invention, a method for implementing a transparent clock is provided, preferably, the method can be implemented by the device shown in FIG. 2.

Figure 5:
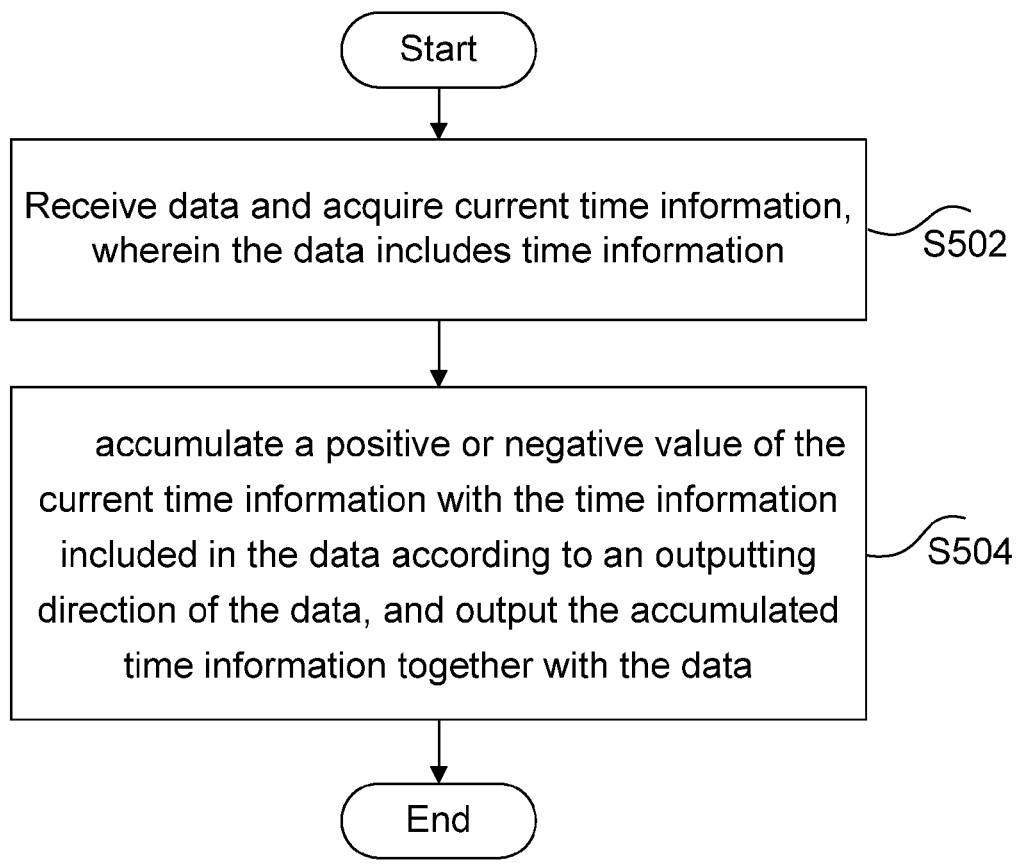
FIG. 5 is a flowchart of a method for implementing the transparent clock according to one method embodiment of the present invention.

FIG. 5 shows the flow of a method for implementing the transparent clock according to one method embodiment of the present invention. It should be explained that the steps shown in the flowchart in the drawings can be executed, for example, in a computer system with a set of computer executable instructions; and besides, although the logic order is shown in the flowchart, the shown or described steps can be also executed in a different order under some conditions.

As shown in FIG. 5, the method for implementing the transparent clock according to one method embodiment includes steps S502 to S504.

Step S502: receiving data and acquiring current time information, wherein the data includes time information; and Step S504: accumulating a positive or negative value of the current time information with the time information included in the data according to an outputting direction of the data, and outputting the accumulated time information together with the data.

The details of the processing process are described below in detail.

(1) Step S502

The device for implementing the transparent clock receives the input data which includes the time information, and acquires the current time information when the device receives the data, preferably, the device can also acquire attribute information of the data, such as a type and a length of the data.

The device caches the received data, the acquired current time information and the attribute information of the data, determines an intermediate checksum according to the data except for the time information included therein, caches the intermediate checksum and outputs the data after receiving an instruction.

(2) Step S504

When the device receives the instruction of outputting the data, it accumulates the positive or negative value of the acquired current time information with the time information included in the data according to the outputting direction of the data; preferably, when the outputting direction of the data is outputting to the current switching node, the negative value of the current time information is accumulated with the time information included in the data; and when the outputting direction of the data is outputting to the next switching node of the current switching node, the positive value of the current time information is accumulated with the time information included in the data.

Preferably, after accumulating the time information, a checksum is determined according to the accumulation result and the intermediate checksum, and then the data is corrected according to the checksum.

Finally, the time accumulation result is included in the data to be output together with the data.

By the method provided by the embodiment, the residence time information of the data in the switching node can be acquired, and the time information included in the data can be corrected according to the residence time information, so that the transparent clock of the data can be effectively realized.

Figure 6:
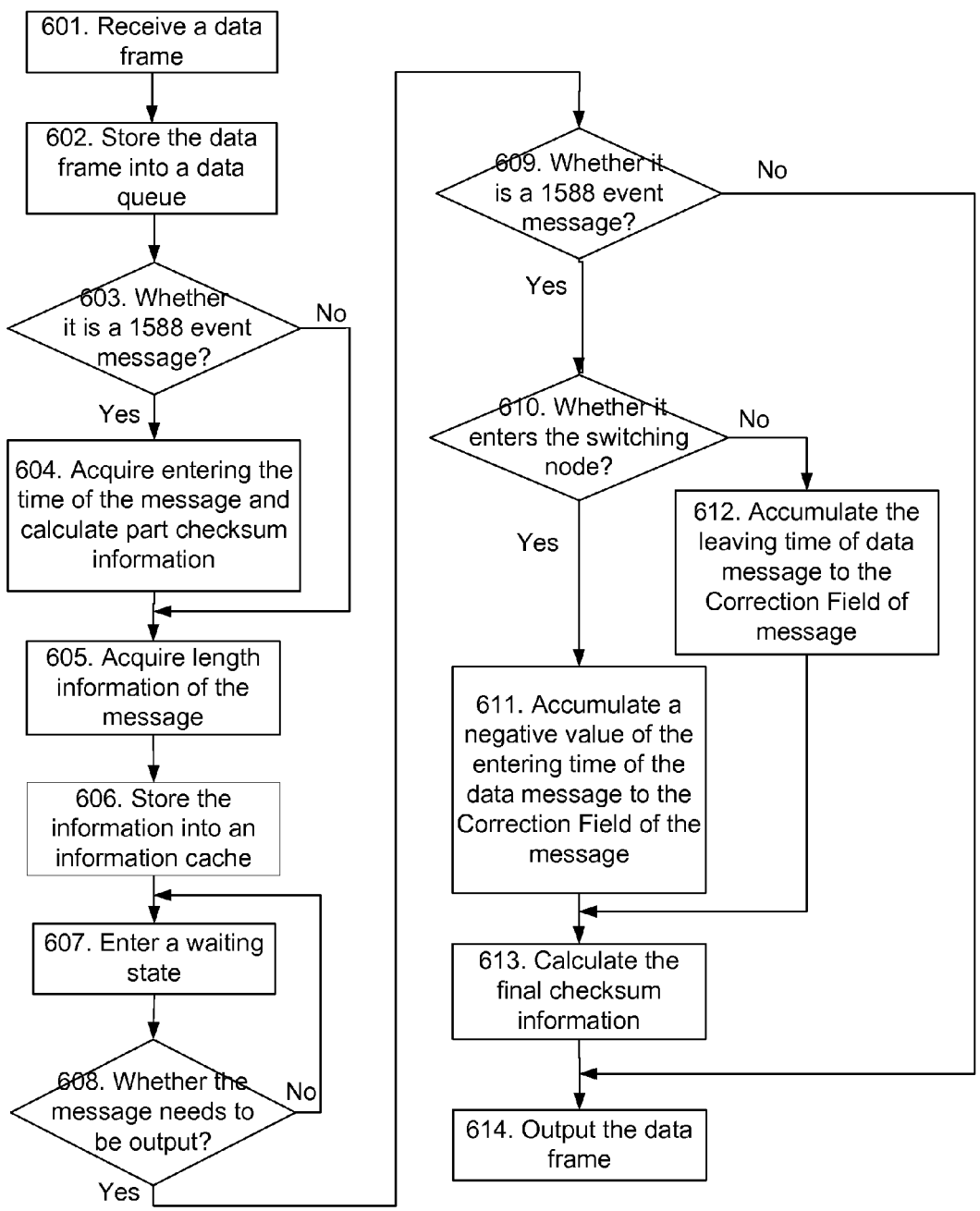
FIG. 6 is a processing flowchart of the method for implementing the transparent clock according to a method embodiment of the present invention.

Based on the abovementioned description, taking the transparent clock processing of the 1588 protocol data as an example, FIG. 6 further shows the processing flow of implementing the method shown in FIG. 5 using the device shown in FIG. 4, as shown in FIG. 6, the processing flow includes the following procedure:

Step S601, a message identification module 302 receives an input data message;

Step S602, the message identification module 302 inputs the received data message to a data queue of a caching module 303;

Step S603, the message identification module 302 identifies the type of the received data message, and determines whether the received data message is a 1588 event message (i.e., a 1588 protocol data), wherein the 1588 protocol stipulates that a message with a Message Type field being 0 to 3 is an event message; and the 1588 message is encapsulated in the format of a UDP message to finally form an IP data packet which is detected by the message identification module 302 layer by layer; and if the input message is a 1588 event message, step S604 is executed, otherwise, step S605 is executed;

Step S604, the message identification module 302 acquires the entering time of the 1588 event message into the hardware device 40 through a clock module 301 and takes a negative value of the time; and a checksum calculation module 305 calculates checksum information of the data except for a Correction Field in the 1588 event message to obtain an intermediate result of calculating the checksum of the UDP message;

Step S605, the message identification module 302 calculates a length of the input data message;

Step S606, the message identification module 302 stores the length of the data message, the negative value of the entering time of the 1588 event message into the device for implementing the transparent clock, and the intermediate result of calculating the checksum of the UDP message into an information queue of the caching module 303;

Step S607, the hardware device enters a waiting state;

Step S608, whether the data frame in the caching module 303 needs to be output is determined according to related information on the line, if it is, step S609 is executed, otherwise, returning to step S607;

Step S609, whether the data frame to be output is a 1588 event message is determined, if it is, step S610 is executed, otherwise, step S614 is executed;

Step S610, whether the output 1588 event message enters the current switching node is determined, if it enters the current switching node, step S611 is executed, otherwise, step S612 is executed;

Step S611, the message correction module 304 accumulates the time information stored in the information queue of the caching module 303 to the Correction Field of the message, wherein the value is the negative value of the corresponding entering time of the 1588 event message into the switching node, and then step S613 is executed;

Step S612, the message correction module 304 acquires the corresponding leaving time of the 1588 event message from the switching node, i.e. the entering time of the data into the hardware device, through the clock module 301, and accumulates the time value to the Correction Field of the message, and then step S613 is executed;

Step S613, the message correction module 304 calculates a final checksum result of the UDP message according to the intermediate checksum result provided by the caching module 303 and the updated Correction Field; and Step S614, the message correction module 304 outputs the data frame.

To sum up, through the technical solution of the present invention, the residence time information of the data in the switching node is acquired by the hardware device, and the time information included in the data is corrected according to the residence time information, so that the transparent clock of the data can be effectively implemented, and the acquired residence time information is of a high precision and is acquired stably; therefore, the problems of poor precision, instability and strong fluctuation of the clock transparent transmission of the data in the related technologies can be solved, and the aim of improving the clock synchronization precision of the system can be achieved.

The above are only preferred embodiments of the present invention and not used for limiting the present invention. For those skilled in the art, the present invention may have various modifications and changes. Any modifications, equivalent replacements, improvements and the like within the spirit and principle of the present invention shall fall within the scope of protection of the present invention.

What is claimed is:

1. A device for implementing a transparent clock, positioned at each port of a switching node, the device comprising: a clock module, a data identification module and a data correction module; wherein the clock module is connected with the data identification module and the data correction module respectively, and provides clock information to the data identification module and the data correction module;

the data identification module is receiving data and acquiring current time information from the clock module; and the data correction module is connected with the data identification module, and accumulates a positive or negative value of the current time information to time information included in the data according to an outputting direction of the data and outputting the accumulated time information together with the data, wherein when the outputting direction of the data is outputting from the device to the switching node, the data correction module accumulates the negative value of the current time information to the time information included in the data; and when the outputting direction of the data is outputting from the device to a next switching node of the switching node, the data correction module accumulates the positive value of the current time information to the time information included in the data; and wherein the device further comprises:

a caching module that caches the data and the current time information received by the data identification module;

a checksum calculation module that determines an intermediate checksum according to the data acquired by the data identification module except for the time information included therein, sending the intermediate checksum to the data identification module, determining a checksum according to the accumulation result and the intermediate checksum in response to a calling by the data correction module and feeding the checksum back to the data correction module; and the data correction module further corrects the data according to the checksum.

2. The device according to claim 1, wherein the data identification module further acquires for acquiring a type of the data, a length of the data and the intermediate checksum.

3. A method for implementing a transparent clock, comprising:

receiving data and acquiring current time information, wherein the data includes time information; and accumulating a positive or negative value of the current time information to the time information included in the data according to an outputting direction of the data, and outputting the accumulated time information together with the data, wherein the processing of accumulating the positive or negative value of the current time information to the time information included in the data according to the outputting direction of the data comprises:

when the data is output to a switching node, accumulating the negative value of the current time information to the time information included in the data; and when the data is output to a next switching node of the switching node, accumulating the positive value of the current time information to the time information included in the data;

wherein prior to accumulating the time information included in the data, the method further comprising:

caching the received data and information; and determining an intermediate checksum according to the data except for the time information included therein; and wherein after accumulating the time information included in the data, the method further comprising:

determining a checksum according to the accumulation result and the intermediate checksum; and correcting the data according to the checksum.

4. The method according to claim 3, wherein after the data is received, the method further comprising:

acquiring information of the data, wherein the information includes a type of the data, a length of the data and the intermediate checksum.

\* \* \* \* \*